United States Patent [19]

Jambor et al.

[11] Patent Number: 4,741,067
[45] Date of Patent: May 3, 1988

[54] HEIGHT-ADJUSTABLE WINDSHIELD WIPER

[75] Inventors: Arno Jambor, Vaihingen/Enz; Gunther Ellenrieder, Esslingen; Hans J. Ostertag, Sindelfingen, all of Fed. Rep. of Germany

[73] Assignee: Daimler-Benz Aktiengesellschaft, Stuttgart, Fed. Rep. of Germany

[21] Appl. No.: 933,396

[22] Filed: Nov. 21, 1986

[30] Foreign Application Priority Data

Nov. 21, 1985 [DE] Fed. Rep. of Germany ....... 3541206

[51] Int. Cl.⁴ ............................................. B60S 1/24
[52] U.S. Cl. ............................................. 15/250.16
[58] Field of Search ........... 15/250.16, 250.17, 250.19, 15/250.27; 296/192, 194

[56] References Cited

U.S. PATENT DOCUMENTS 2,206,822 7/1940 Rousseau ........................... 15/250.16
2,895,157 7/1959 Kocourek ...................... 15/250.16 X
3,887,958 6/1975 Fukasawa et al. ............... 15/250.17
4,466,153 8/1984 Seibicke ............................ 15/250.16

FOREIGN PATENT DOCUMENTS 0094521 11/1983 European Pat. Off. .

Primary Examiner—Peter Feldman
Attorney, Agent, or Firm—Barnes & Thornburg

[57] ABSTRACT

In a windshield wiper installation for vehicles, the windshield wipers are lowered into a rest position behind an engine hood after the wiper motor is turned off in that a support arm which supports the wiper motor, the wiper gear and the wiper arm is displaced changing in height along at least one toothed rack guidance by an adjusting motor acting on a pinion.

13 Claims, 2 Drawing Sheets

HEIGHT-ADJUSTABLE WINDSHIELD WIPER

The present invention relates to a windshield wiper installation for vehicles with wipers driven by a wiper motor by way of a wiper gear, which after turning off the motor are lowered from an operating position in a wiping field in front of a windshield by an additional movement into a rest position behind the engine hood.

It is known to construct the wipers of a windshield wiper system which wipe legally prescribed wiper fields on the windshield, so as to be lowerable for styling reasons and for assuring an optimum pedestrian protection.

A lowered rest position is achieved in the EP-OS No. 00 94 521 in that a coupling rod displaces a rocker arm along a worm gear-worm translation, on which a wiper linkage is angularly supported, as a result of which the wiper arms are inclined more strongly and pull down the wiper blades.

With this construction, the height difference of the wiper support from the operating to the rest position can be maximally as large as is achieved by a 180° rotation of a coupling rod support point on the worm gear. Owing to the radius of the worm gear which for space reasons can be increased only within limits, and owing to the angular transmission of the displacement movement onto the wipers, the resulting lowering is small.

The present invention is therefore concerned with the task to obtain with simple means a direct vertical wiper lowering which is barely limited in its extent, permits a complete covering of the windshield wiper installation by the engine hood in the rest position and can be used for every vehicle type and is adaptable in a simple manner.

The underlying problems are solved according to the present invention in that the wiper motor, the wiper gear and the wiper arm are supported on a support arm which is adjustable in height at least along one toothed rack guidance by way of a pinion driven by an adjusting motor.

The kinematics of the wiper linkage are not changed so that the windshield wiper installation is completely operational already in the transition from the rest to the operating position.

The pivot or displacement travel of the wiper arm is determined by the adjusting travel of the pinion. As a result thereof, the windshield wiper installation can be matched to all necessary height differences between operating and rest position of different types of vehicles.

These and other objects, features and advantages of the present invention will become more apparent from the following description when taken in connection with the accompanying drawing which shows, for purposes of illustration only, two embodiments in accordance with the present invention, and wherein:

FIG. 4 is a plan view, partly in cross section, on a stopping means of the support arm in the operating position.

Figure 1:
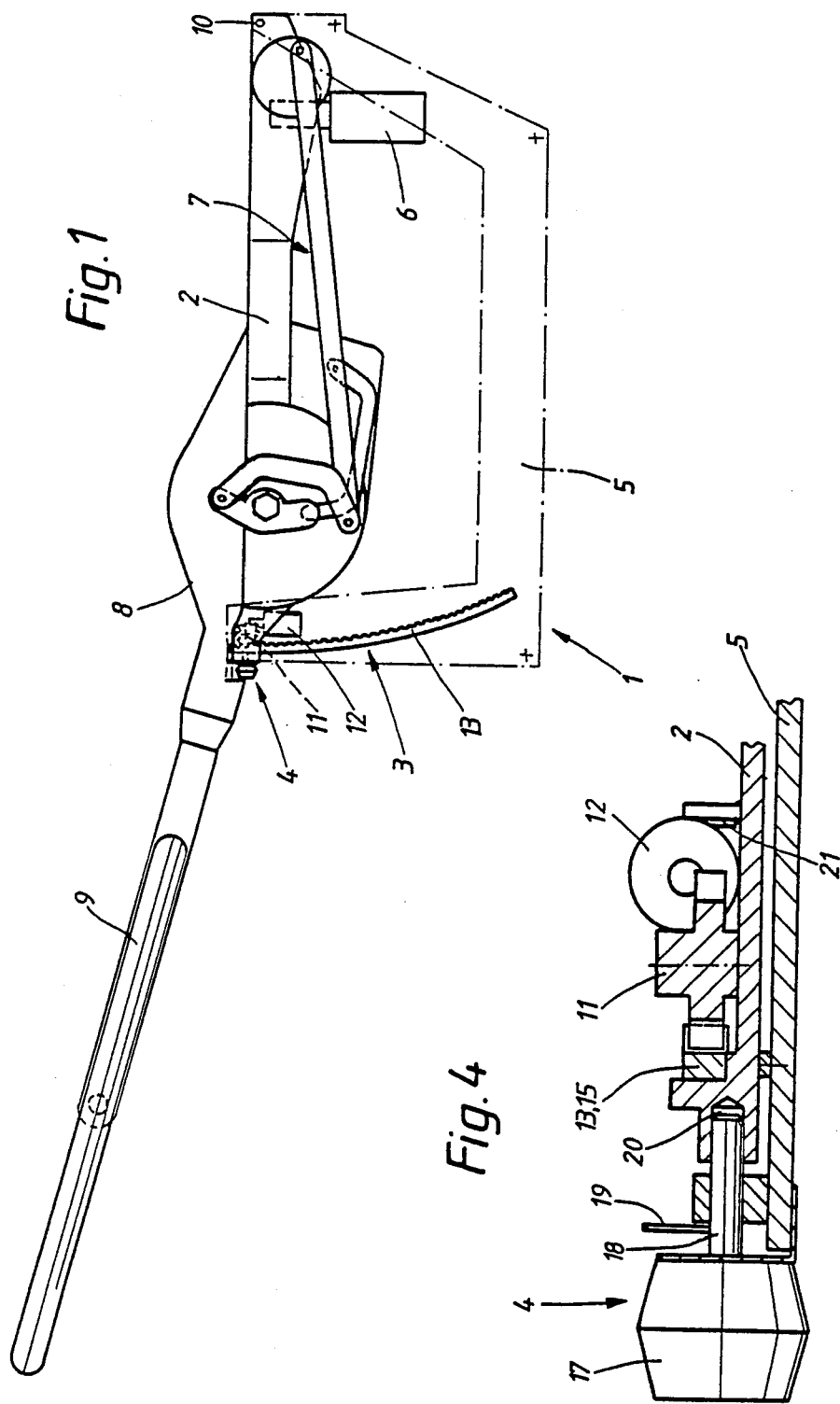
FIG. 1 is a somewhat schematic front elevational view of the entire assembly of a windshield wiper installation in accordance with the present invention.

Referring now to the drawing wherein like reference numerals are used throughout the various views to designate like parts, the construction of a windshield wiper installation generally designated by reference numeral 1 can be seen from FIG. 1 whose support arm 2, toothed rack guidance 3, and stopping means 4 are preassembled, combined into an assembly unit on a base plate 5 which is attached at the body (not shown). The support arm 2 supports a wiper motor 6, a wiper gear generally designated by reference numeral 7, and a wiper arm 8 with a wiper blade 9; the support arm 2 is unilaterally pivotally supported by a mounting bolt 10 and is guided on the other side along a toothed rack arc 13 by way of a pinion 11 which is driven by an adjusting motor 12.

In the upper operating position of the support arm 2, the latter is held positionally stable by the stopping means 4.

Figure 2:
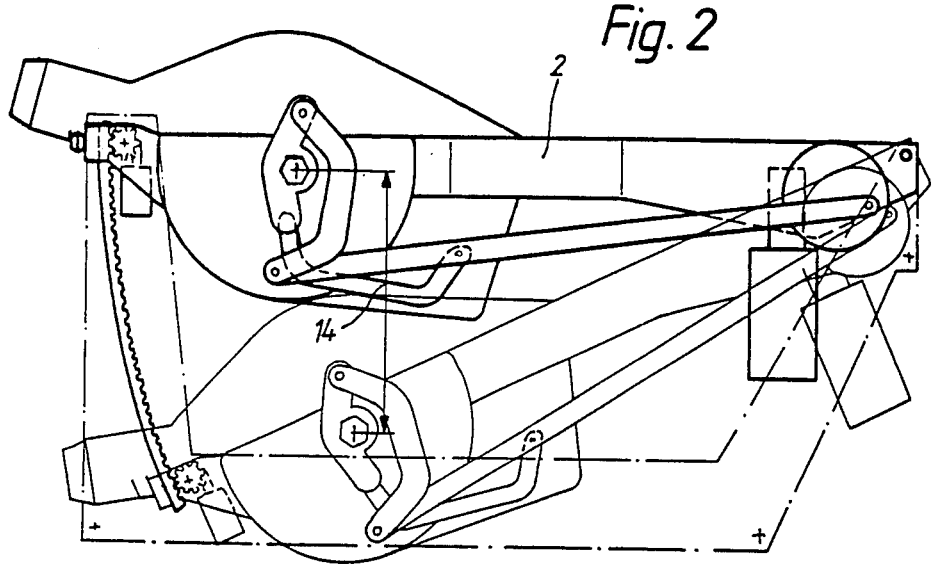
FIG. 2 is a somewhat schematic front elevational view of a pivotal construction of a windshield wiper installation in accordance with the present invention in the operating position thereof and in thin lines in the rest position thereof.

FIG. 2 illustrates the same construction with the support arm 2 in the operating position and in the lowered rest position shown in thin lines; during the height adjusting movement the support arm 2 traverses maximally the lowering distance 14.

Figure 3:
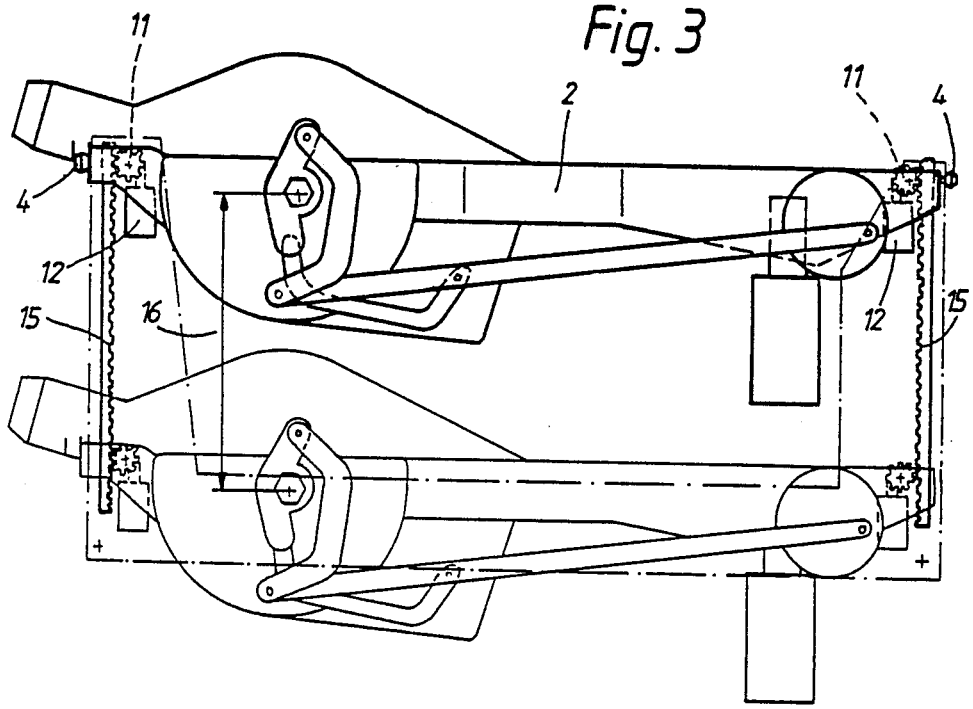
FIG. 3 is a somewhat schematic front elevational view of a windshield wiper installation similar to FIG. 2 but of rectilinearly displaceable construction.

In FIG. 3, the support arm 2 is guided on both sides along two rectilinear parallel toothed racks 15 by way of pinions 11 driven by adjusting motors 12 and is thereby maximally adjustable in height between an upper operating position and a lower rest position by the lowering distance 16.

FIG. 4 illustrates a stopping means generally designated by reference numeral 4 in which a bolt 18 supported at the base plate 5 and movable in the axial direction by an adjusting member 17, which can also be adjusted manually by way of a handle member 19, is brought into engagement with a lateral bore 20 in the support arm 2.

The adjusting motor 12 serving as support arm drive can be disconnected from the pinion 11 by a detent hinge 21 and thus releases the support arm 2 for a manual height adjustment.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A windshield wiper installation for vehicles, with wiper means driven by a wiper motor by way of wiper gear means, and in which the wiper means are operable to be lowered after deenergization of the wiper motor by an additional movement from an operating position in a wiper field in front of a windshield into a rest position behind an engine hood, comprising support arm means for supporting thereon the wiper motor, the wiper gear means and the wiper arm means, said support arm means being adjustable in height at least along one toothed rack guidance means by way of a pinion driven by an adjusting motor, wherein the support arm means is pivotally supported at one end thereof fixed at the vehicle and is guided at its other end along an arc of a toothed rack means.

2. A windshield wiper installation according to claim 1, wherein the toothed rack guide means is formed by two rectilinear, substantially parallel toothed rack means along both ends of the support arm means.

3. A windshield wiper installation according to claim 1, wherein the support arm means is stoppable in its working position by a stopping means.

4. A windshield wiper installation according to claim 3, wherein the stoppage takes place by the engagement of a displaceable bolt in a lateral receiving means on the support arm means.

5. A windshield wiper installation according to claim 1, wherein the adjusting motor is manually pivotal out of engagement and a movement of the support arm means into the working position and the stoppage can be carried out manually.

6. A windshield wiper installation according to claim 3, wherein the support arm means, the stoppage means and the toothed rack guide means are combined into a preassembly unit on a base plate.

7. A windshield wiper installation according to claim 1, wherein the wiper motor and the adjusting motor are simultaneously controllable independently of one another.

8. A windshield wiper installation for vehicles, with wiper means driven by a wiper motor by way of wiper gear means, and in which the wiper means are operable to be lowered after deenergization of the wiper motor by an additional movement from an operating position in a wiper field in front of a windshield into a rest position behind an engine hood, comprising support arm means for supporting thereon the wiper motor, the wiper gear means and the wiper arm means, said support arm means being adjustable in height at least along one toothed rack guidance means by way of a pinion driven by a adjusting motor;

wherein the support arm means is stoppable in its working position by a stopping means;

wherein the support arm means, the stoppage means and the toothed rack guide means are combined into a preassembly unit on a base plate; and wherein the support arm means is pivotally supported at one end thereof fixed at the vehicle and is guided at its other end along an arc of a toothed rack means.

9. A windshield wiper installation according to claim 6, wherein the toothed rack guide means is formed by two rectilinear, substantially parallel toothed rack means along both ends of the support arm means.

10. A windshield wiper installation according to claim 6, wherein the stoppage takes place by the engagement of a displaceable bolt in a lateral receiving means on the support arm means.

11. A windshield wiper installation according to claim 10, wherein the adjusting motor is manually pivotal out of engagement and a movement of the support arm means into the working position and the stoppage can be carried out manually.

12. A windshield wiper installation according to claim 3, wherein the wiper motor and the adjusting motor are simultaneously controllable independently of one another.

13. A windshield wiper installation according to claim 12, wherein the support arm means, the stoppage means and the toothed rack guide means are combined into a preassembly unit on a base plate.

* * * * *